(No Model.)

R. EGLI.

MACHINE FOR MAKING SHOE AND UPHOLSTERERS' NAILS.

No. 280,458. Patented July 3, 1883.

Fig. 1.

WITNESSES:

INVENTOR
Rudolf Egli
BY T. C. Brecht
ATTORNEY (No Model.) 7 Sheets—Sheet 2.

R. EGLI.
MACHINE FOR MAKING SHOE AND UPHOLSTERERS' NAILS.

No. 280,458. Patented July 3, 1883.

(No Model.) 7 Sheets—Sheet 3.

R. EGLI.
MACHINE FOR MAKING SHOE AND UPHOLSTERERS' NAILS.

No. 280,458. Patented July 3, 1883.

WITNESSES:
Jos. N. Rosenbaum.
H. Kasbach.

INVENTOR
Rudolf Egli
BY T. C. Brecht
ATTORNEY (No Model.) 7 Sheets—Sheet 4.

R. EGLI.

MACHINE FOR MAKING SHOE AND UPHOLSTERERS' NAILS.

No. 280,458. Patented July 3, 1883.

WITNESSES: INVENTOR
Jno. N. Rosenbaum Rud. Egli
Otto Risch BY T. C. Brecht
ATTORNEY (No Model.)   7 Sheets—Sheet 5.

R. EGLI.
MACHINE FOR MAKING SHOE AND UPHOLSTERERS' NAILS.

No. 280,458.   Patented July 3, 1883.

(No Model.) 7 Sheets—Sheet 6.

R. EGLI.
MACHINE FOR MAKING SHOE AND UPHOLSTERERS' NAILS.

No. 280,458. Patented July 3, 1883.

WITNESSES:
Jol. N. Rosenbaum.
H. Rassbach.

INVENTOR
Rudolf Egli
BY T. C. Brecht
ATTORNEY

N. PETERS, Photo-Lithographer, Washington, D. C.

(No Model.)

R. EGLI.

MACHINE FOR MAKING SHOE AND UPHOLSTERERS' NAILS.

No. 280,458. Patented July 3, 1883.

WITNESSES:

INVENTOR

Rudolf Egli

BY

ATTORNEY

UNITED STATES PATENT OFFICE.

RUDOLF EGLI, OF RAPPERSCHWYL, ASSIGNOR TO ALEX. BANNWART, OF ZURICH, SWITZERLAND.

MACHINE FOR MAKING SHOE AND UPHOLSTERERS' NAILS.

SPECIFICATION forming part of Letters Patent No. 280,458, dated July 3, 1883.

Application filed June 10, 1882. (No model.) Patented in Germany May 16, 1880, No. 13,303.

*To all whom it may concern:*

Be it known that I, RUDOLF EGLI, of Rapperschwyl, in the Republic of Switzerland, have invented certain new and useful Improvements in Machines for Making Shoe and Upholsterers' Nails, of which the following is a specification.

This invention has reference to an improved machine for making shoe and upholsterers' nails, of any desired size and shape, from a continuous piece of wire, of proper thickness, that is fed through the machine and acted upon successively by the different mechanisms composing the machine in such a manner that each rotation of the driving-shaft of the machine produces an entirely-finished nail.

The invention consists, essentially, of a combination of the following instrumentalities: first, a mechanism for taking up and intermittently feeding the wire to the machine; secondly, a cutting mechanism whereby nail-blanks of proper size are cut off from the wire and the shank of the nail is formed; thirdly, a carrying mechanism which takes hold of the nail-blank and conducts it forward to the jaws of the lower die, which is arranged in front of the cutting mechanism, and to which jaws the nail-blank is delivered; fourthly, a drop-die that is released at the proper moment so as to form the head of the nail while the blank is supported by the lower die; fifthly, an oscillating mechanism for throwing out the finished nail; and, lastly, of suitable power-transmitting mechanisms, whereby the proper motion is imparted to the different working parts of the machine from a common driving-shaft, which mechanisms will be more fully described hereinafter.

In the accompanying drawings, Fig. 5 is a vertical transverse section of the machine. Fig. $5^a$ is a detail side view of the spring that actuates the drop-die, together with some other details.

Similar letters of reference indicate corresponding parts.

A in the drawings represents a strong supporting-frame of cast-iron or other suitable material, which frame consists of upright side standards, A', transverse connecting-pieces $A^2$, and a table, B, upon which the cutting and nail-blank-carrying mechanisms are supported. At the lower part of the supporting-frame A is arranged, on a supporting-bracket, a fixed spindle for the wire-reel C, from which the wire is fed to the machine. From the reel C the wire is conducted to the intermittently-actuated wire-feeding mechanism D, which is attached to an upright portion of the frame A, below the table B, and vertically below the cutting-knives.

Figure 1:
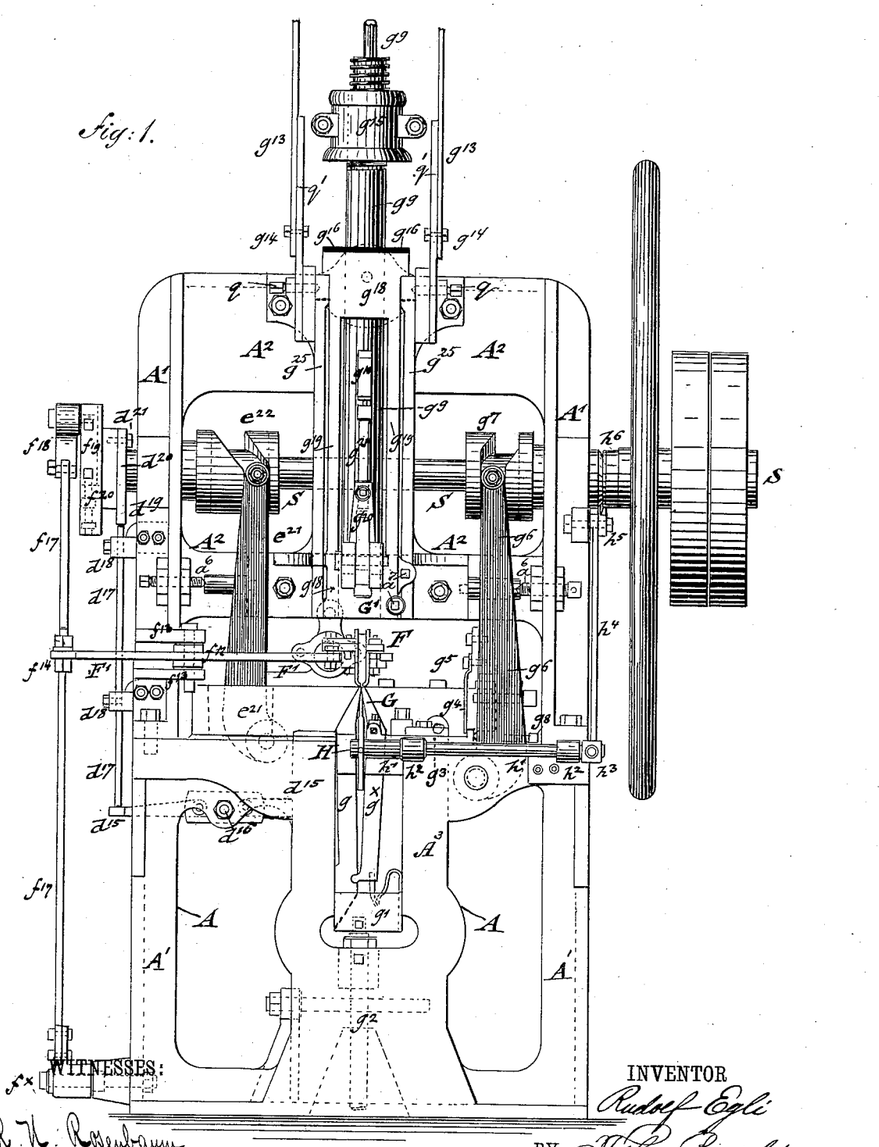
Figure 1 represents a front elevation of my improved machine for making shoe and upholsterers' nails.
Figure 6:
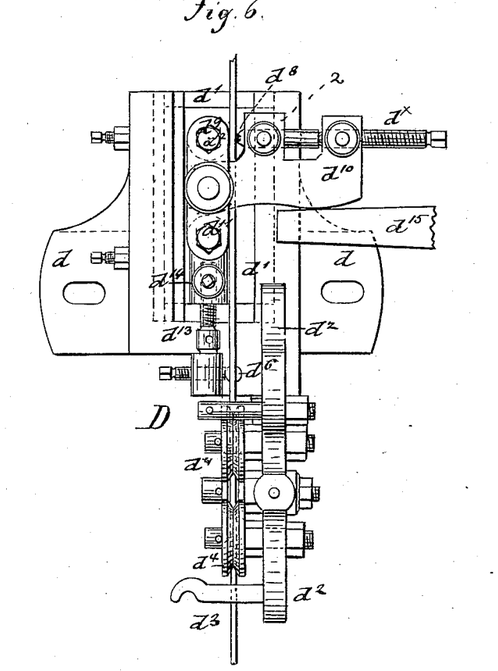
Figs. 6 and $6^a$ are a detail front and side elevation of the wire-feeding mechanism. Fig. $6^b$ is a top view of Fig. 6.
Figure 6A:
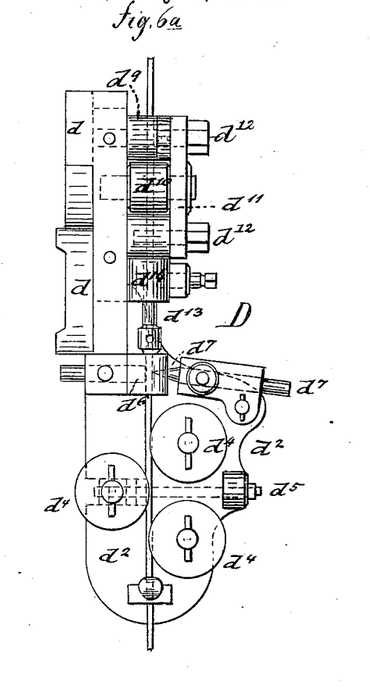
Figure 6B:
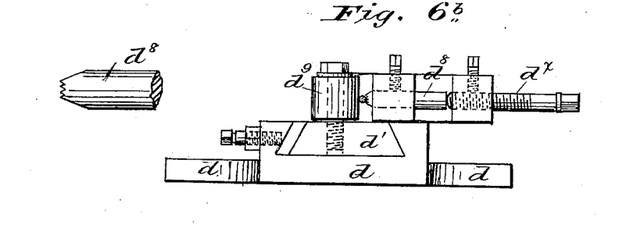

*The wire-feeding mechanism.*—The wire-feeding mechanism D is shown in detail in Figs. 6, $6^a$, and $6^b$, and consists of a supporting-plate, $d$, which guides in suitable ways a sliding carriage, $d'$. The lower part of the supporting-plate $d$ is formed with a bracket-plate, $d^2$, which is arranged at right angles to the plate, and carries at its lower end a hook-shaped arm, $d^3$, having a guide-opening corresponding to the cross-section of the wire. Above the guide-opening of the arm $d^3$ are applied to the bracket-plate $d^2$ three wire-straightening rollers, $d^4$—two on one, the third on the other side of the wire. The bearing of the third roller $d^4$ is adjustable by a screw, $d^5$, so as to be set nearer to or farther away from the opposite rollers, whereby they can be accurately set to the thickness of the wire. The wire is conducted from the straightening-rollers $d^4$ past a fixed retaining-cheek, $d^6$, and an inclined dog, $d^7$, which latter is adjustably secured to a fulcrumed sleeve shown clearly in Fig. 6ª, so that the sharp edge of the dog "bites" the wire and presses it against the retaining-cheek $d^6$, whereby the receding of the wire is prevented at the moment when the forward-feeding motion is interrupted. The dog $d^7$ is made adjustable in its fulcrumed sleeve, so as to be set, like the straightening-rollers, to the thickness of wire used. The wire is then taken up by the feeding mechanism proper, which consists of a serrated jaw, $d^8$, and a steel friction-roller, $d^9$, between which the wire is passed in upward direction. The jaw $d^8$ is supported on a bearing, 2, on a lever, $d^{10}$, that is pivoted to the sliding carriage $d'$, the grooved serrated jaw $d^8$ serving to bite the wire and press it against the steel friction-roller $d^9$. This roller is made in two pieces, one narrower than the other, so that when the wide piece has become worn it can be reversed with the narrow part of said roller. $d^x$ is an adjusting-screw on the lever $d^{10}$, and is for adjusting the jaw $d^8$ and forcing the same against the wire when the jaw is worn. The friction-roller $d^9$, as well as the pivoted lever $d^{10}$, is retained on the sliding carriage $d'$ by a covering-plate, $d^{11}$, secured by screws $d^{12}$. The sliding carriage $d'$ is adjusted higher or lower in its ways on the supporting-plate $d$ by means of a vertical adjusting-screw, $d^{13}$, which turns in a screw-socket, $d^{14}$, and bears on a fixed seat of the main plate $d$, so as to exactly regulate the distance to which the wire is to be fed forward, according to the size of the nails to be made on the machine. The lever $d^{10}$ on the sliding carriage $d'$ is operated by one end of the lever $d^{15}$, which is fulcrumed to the main frame at $d^{16}$, Fig. 1, as shown in dotted lines in said figure. Lever $d^{15}$ is made in two sections rigidly secured to a plate which constitutes a part of the lever, and which is the part fulcrumed to said pivot $d^{16}$. The opposite end of the lever $d^{15}$ is operated by a vertical rod, $d^{17}$, which is guided in side bearings, $d^{18}$, on one of the side standards, A′, of the frame A, as shown clearly in Figs. 1 and 2. The lever $d^{15}$ abuts against the under side of lever $d^{10}$, as shown in Fig. 6, and when the rod $d^{17}$ is depressed, the opposite end of lever $d^{15}$ rises, and, acting on lever $d^{10}$, serves to move the carriage upward. The rod $d^{17}$ is moved downward at each revolution of the driving-shaft S by a projection or nose, $d^{19}$, on a ring or eccentric, $d^{20}$, which latter is attached by a set-screw, $d^{21}$, to the inner face of a hub or collar on the outer end of the driving-shaft S, as shown in Fig. 1. When the nosed eccentric $d^{19}$ presses downward on the rod $d^{17}$, it forces the lever $d^{15}$ down, raises the opposite end thereof and presses it against the lever $d^{10}$, so as to force the jaw $d^8$ against the wire, which in turn is held in place on its opposite side by the friction-roller $d^9$. This motion of the lever $d^{15}$ also lifts the sliding carriage $d'$, with its lever $d^{10}$, and feeds the wire forward the distance required by the size of the nail-blank.

Figure 4:
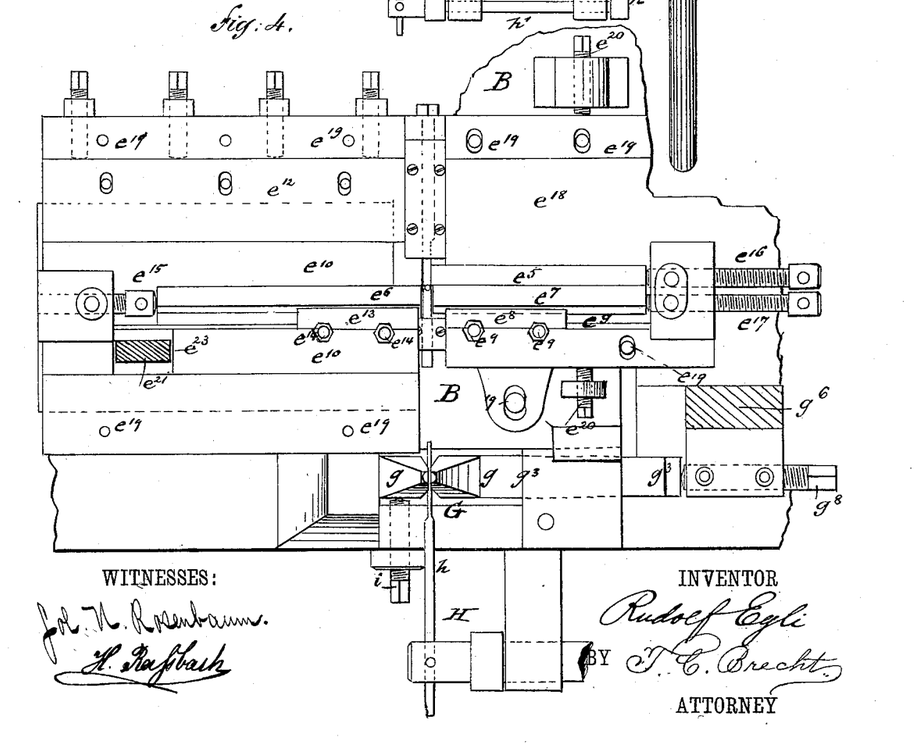
Fig. 4 is a plan view of the cutting mechanism, drawn on a larger scale, showing also the lower die or anvil and the throwing-out mechanism.
Figure 5:
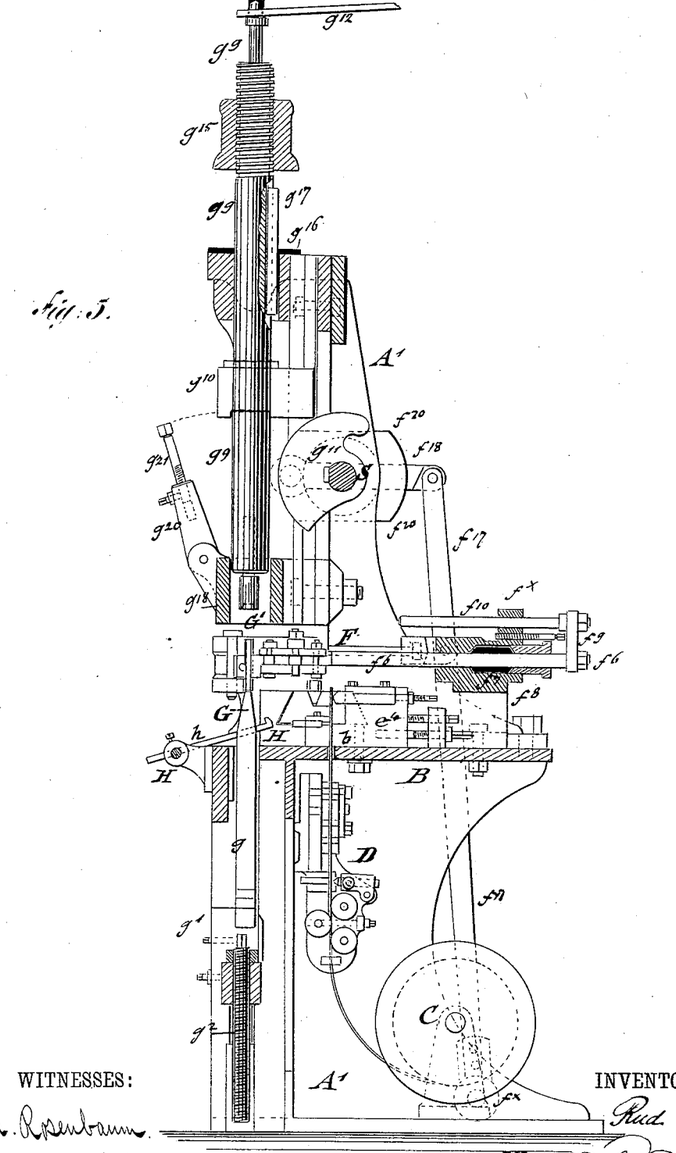
Figure 5A:
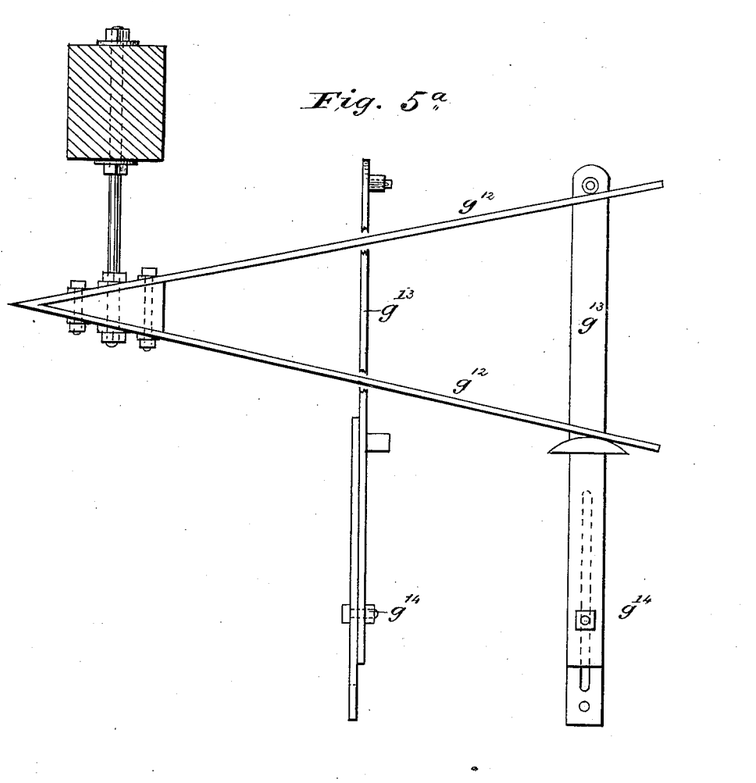
Figure 7:
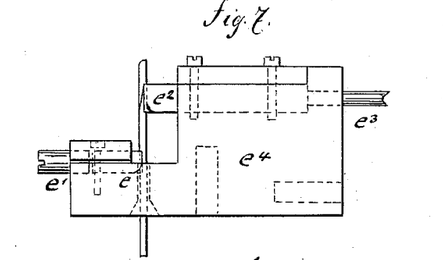
Figs. 7, $7^a$, and $7^b$ are a detail side view, an end view, and a top view of the mechanism for holding the wire for the action of the cutting-dies.
Figure 7A:
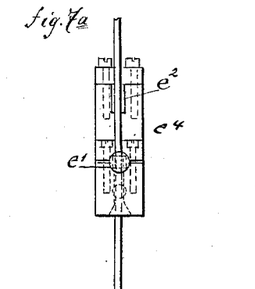
Figure 7B:
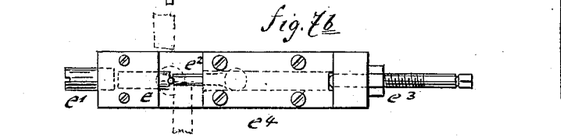
Figure 8:
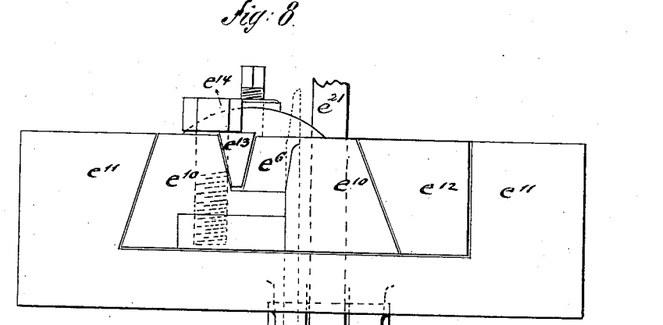
Figs. 8 and 9 are detail end views of the fixed and movable knives for cutting off the nail-blanks.
Figure 9:
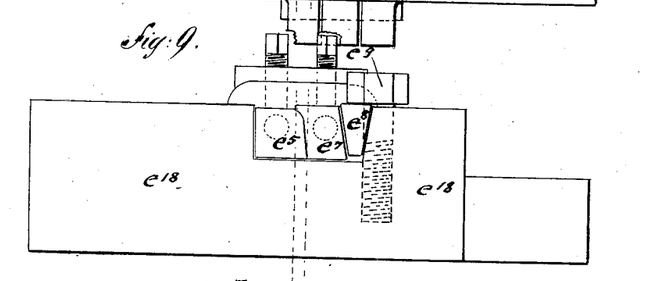
Figure 12:
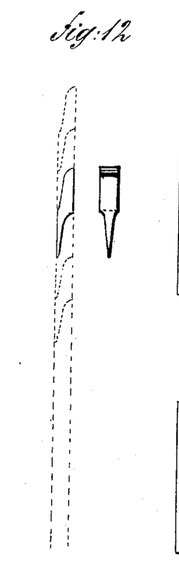
Fig. 12 is a detail side view of a nail-blank, the dotted lines indicating the manner in which the blanks are cut from the wire.

*The nail-blank-cutting mechanism.*—The mechanism for cutting the nail-blanks from the wire is shown in Figs. 4, 8, and 9. Before the wire is cut off by the cutting-knives it is passed through a hole, $b$, in the table B, (shown in Fig. 5,) and then guided intermediately between the table B and the cutting-knives along two stationary guide-jaws, $e$ $e^2$, the lower jaw, $e$, of which has a guide-groove in its face, and is adjusted by a set-screw, $e'$, to the proper size of the wire, while the upper jaw, $e^2$, is arranged at the opposite side of the wire, and is similarly adjusted by a screw, $e^3$, as shown clearly in detail in Figs. 7, 7ª, and 7ᵇ. The upper jaw, $e^2$, is also grooved for guiding and retaining the wire, said grooves being rounded off at the lower part of the jaws, so as to permit the easy introduction of the wire when the machine is started for work. The two guiding and holding jaws $e$ and $e^2$ are supported and adjusted in a step-shaped box, $e^4$, by means of suitable screws, as shown in Fig. 7, 7ª, and 7ᵇ. The box or casing $e^4$, which supports the guiding and holding jaws $e$ $e^2$, is secured in the proper position on the table B by suitable set-screws, as shown in Fig. 5. The cutting mechanism proper consists of a fixed knife, $e^5$, and of a laterally-movable cutting-knife, $e^6$, the knives being so formed as to shape the nail-blank as shown in Fig. 12. The movable cutting-knife $e^6$ serves also for the purpose of pressing the shank of the nail-blank against a fixed cheek, $e^7$, that is arranged in front of the fixed cutting-knife $e^5$, and locked tightly sidewise of the same to the supporting-plate $e^{18}$ on the table B by a wedge-shaped locking-piece, $e^8$, which is securely held in position by pressure-screws $e^9$, as shown clearly in Figs. 4 and 9. The movable cutting-knife $e^6$ is secured in a recess of a sliding carriage, $e^{10}$, which moves in fixed ways $e^{11}$, and is retained therein by a side piece, $e^{12}$, (shown clearly in Fig. 8,) while the cutting-knife is tightly secured in the sliding carriage $e^{10}$ by a wedge-piece, $e^{13}$, which is retained by pressure-screws $e^{14}$, as shown in Figs. 4 and 8. The movable cutting-knife $e^6$ is adjustable in its sliding carriage by means of an adjusting-screw, $e^{15}$, which serves to adjust said knife after it has been sharpened, and thereby shortened. The fixed cutting-knife $e^5$, as well as the cheek $e^7$, against which the wire is pressed during the cutting action, is also adjustable by set-screws $e^{16}$ and $e^{17}$, as shown in Fig. 4. The supporting-ways $e^{11}$ of the movable cutting-knife, as well as the supporting-box $e^{18}$ of the fixed cutting-knife, are screwed down upon the table B by a number of fastening-screws, $e^{19}$. The box $e^{18}$ is adjusted laterally by means of the adjusting-screw $e^{20}$, which passes through lugs cast on the table B. The object is to bring the sides of the knives $e^5$ and $e^6$ directly in line with each other, so that they can just pass each other. The movable cutting-knife $e^6$ is actuated by an oscillating lever, $e^{21}$, which is pivoted at its lower end to the front part of frame A, and engaged at its upper by a grooved cam, $e^{22}$, of the shaft S. The lever $e^{21}$ acts upon the rear end of the sliding carriage $e^{10}$ at each revolution of the driving-shaft, said lever being shown in cross-section in Fig. 4 and in side elevation in Fig. 1, the lever in Fig. 4 being shown passing through an opening, $e^{23}$, in carriage $e^{10}$. The nail-blank which is cut off by the cutting mechanism consists of a thicker upper part, from which the head of the nail is formed, and of a pointed lower portion, from which the shank is formed, as shown clearly in Fig. 12.

Figure 2:
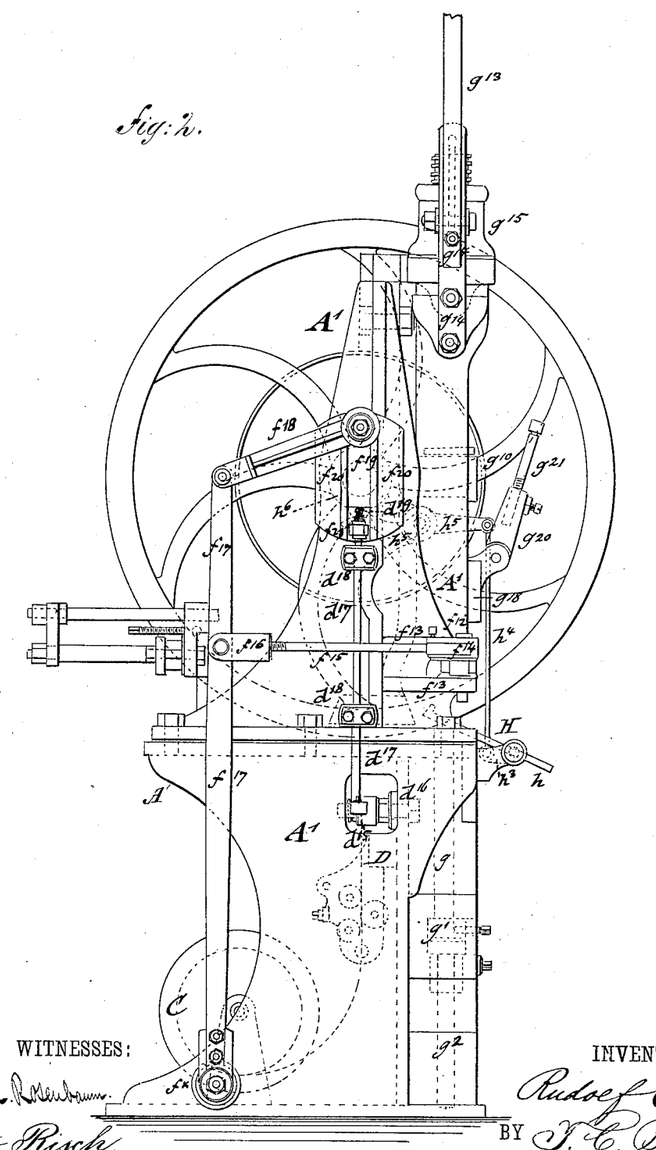
Fig. 2 is a side elevation.
Figure 3:
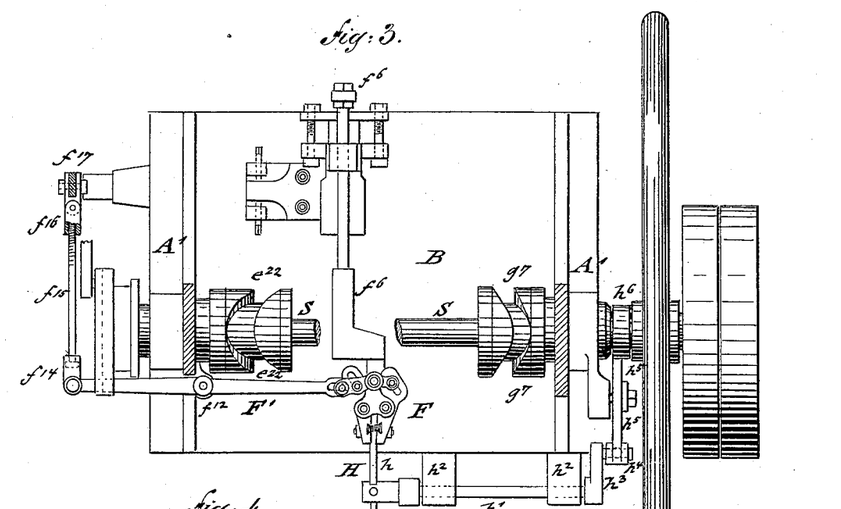
Fig. 3 is a plan view, with parts broken away, of the nail-blank-carrying mechanism.
Figures 10, 11, 13, 14, 15, 16, 17:
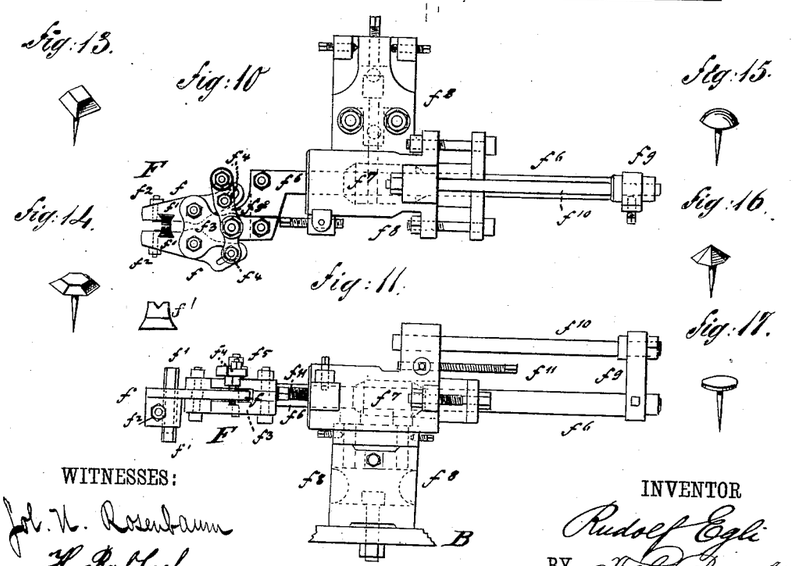
Figs. 10 and 11 are detail top and side views of the mechanism for carrying the nail-blanks from the cutting mechanism to the lower die or anvil.
Figs. 13, 14, 15, 16, and 17 are perspective views of different shapes of shoe and upholsterers' nails, which can be made by my improved machine.

*The nail-blank-carrying mechanism.*—The nail-blank carrying mechanism F is shown in Figs. 1, 3, 5, 10, and 11, and consists, essentially, of two fulcrumed jaw-levers, $f\,f$, which carry the jaws $f'$, that take up the nail-blank, one jaw having a straight face, the other an angularly-grooved face, as shown in Fig. 10. The jaws are retained in grooves of the jaw-levers by means of retaining wedge-pieces $f^2$, that are applied to the dovetailed shanks of the jaws. The jaw-levers $f$ are fulcrumed to the forked support $f^3$, and provided at their rear ends with oblique slots, to be engaged by the connecting-pins $f^4$ of a short lever, $f^5$, that is fulcrumed intermediately between the actuating-pins $f^4$ to the forked support $f^3$. The outer end of the short lever $f^5$ is pivoted to the inner end of a fulcrumed lever, F′, which serves to operate the entire nail-blank-carrying mechanism, Figs. 1 and 3. The forked holder $f^3$ is rigidly secured to the front end of a guide-rod, $f^6$, which is guided in a stuffing-box, $f^7$, in a support, $f^8$, secured rigidly to the table B, as shown in Figs. 5 and 11. The guide-rod $f^6$ slides in the stuffing-box $f^7$, the packing material of which serves to retard the motion of the guide-rod to some extent, for the purpose of stopping the carrying mechanism, until the jaw-levers are entirely opened or closed when they arrive at the ends of their movement. The friction upon the guide-rod $f^6$ is regulated by compressing the packing material in the stuffing-box in the usual manner. To the rear end of the connecting-rod $f^6$ is applied, by a fixed connecting-piece, $f^9$, an auxiliary guide-rod, $f^{10}$, which slides in a lug on the stuffing-box $f^7$, said auxiliary rod serving the purpose of preventing the guide-rod $f^6$ from turning upon its axis. The stuffing-box $f^7$ is further provided at its front and rear ends with stop-screws $f^{11}$, which serve to stop the nail-blank-carrying mechanism F in its forward and backward movements, so as to stop the jaws $f'$ exactly at the point where they take the nail-blank from the cutting-knives $e^5 e^6$ and at a point vertically above the fixed lower die or anvil, G, which is arranged at the front part of the machine. The fulcrum $f^{12}$ of the actuating-lever F′ of the nail-blank-carrying mechanism is supported in lugs $f^{13}$ of the side standards, A′, of the supporting-frame A, as shown in Figs. 1 and 3. The outer end of the lever F′ is pivoted to a screw-socket, $f^{14}$, to which is attached a backwardly-extending rod, $f^{15}$, which is screwed at its front end into the socket $f^{14}$ and at its rear end into a second screw-socket, $f^{16}$, that is pivoted to an upright oscillating rod, $f^{17}$. This rod is pivoted at its lower end to a fixed pivot-pin, $f^\times$, at the lower part of the supporting-frame A, as shown in Figs. 1 and 2, and at its upper end to a link, $f^{18}$, that is pivoted to a slide-piece, $f^{19}$, which is adjustable in a diametrical dovetailed groove in a plate, $f^{20}$, at the end of the driving-shaft S. The slide-piece $f^{19}$ is adjusted nearer to or farther away from the center of the driving-shaft S by an adjusting-screw, $f^{21}$, whereby the motion of the nail-blank-carrying mechanism may be made equal to the exact distance of the cutting-knives $e^5 e^6$ from the lower die, G. The adjusting-screw $f^{21}$ regulates the extent of motion of the carrier so as to do its work properly, while the screw-rod $f^{15}$, that connects the oscillating lever $f^{17}$ with the fulcrumed lever F′, serves to adjust the mechanism forward or backward relatively to the knives or to the lower die, so that consequently the proper position as well as the requisite motion is imparted to the nail-blank carrier.

*The nail-forming dies.*—The dies by which the proper shape is given to the head of the nail are clearly shown in Figs. 1, 4, and 5. They consist of the lower die, G, which is formed of two sections or jaws, $g\,g^\times$, that form a kind of anvil, and the drop-die G′. The jaws $g\,g^\times$ are attached to a base-block, $g'$, said base-block being adjusted higher or lower by a vertical set-screw, $g^2$, (shown in Fig. 5,) as required by the gradual wearing off of the die. One of the jaws, $g$, is rigidly held by a set-screw, $i$, Fig. 4, to the supporting base-block $g'$ and to the front upright, A³, of the supporting-frame, while the other jaw, $g^\times$, is made movable and is connected to a horizontally-guided slide-piece, $g^3$, which is engaged at its opposite end by a strong spring, $g^4$, secured by a bolt, $g^5$, to the actuating-lever $g^6$. The lever $g^6$ is fulcrumed to the frame below the table B, and engaged at its upper end by a grooved cam, $g^7$, of the driving-shaft S. An adjusting-screw, $g^8$, acts upon the outer end of the slide-piece $g^3$, while the spring $g^4$ acts upon a projecting lug of the same, as shown clearly in Fig. 1. When the nail-blank carrier F has arrived at the end of its forward motion, it is vertically above the lower jaws, $g\,g^\times$, as shown in Fig. 1. The jaws of the carrier are then opened and the nail-blank is inserted into the space between the die-sections $g\,g$. For this purpose the movable jaw $g$ is drawn back by its actuating mechanism so as to admit the pointed shank of the nail-blank into the tapering socket formed by grooves in the faces of the jaws $g\,g^\times$. The moment that the blank is delivered to the jaws $g\,g^\times$ the lever $g^6$ and slide-piece $g^3$ press the movable jaw forward to take hold of the shank of the blank. As soon as the carrier F has delivered the blank to the jaws $g\,g^\times$ it is returned out of the way of the drop-die G′, which is then dropped to form the head of the nail. The drop-die G′ is arranged vertically above the lower die, G, at the lower end of a heavy cylinder, $g^9$, which is guided by the upper part of the supporting-frame. The drop-die G' has at its lower end a recess or indentation of suitable shape, according to the shape to be imparted to the head of the nail. To the middle portion of the drop-cylinder $g^9$ is keyed a piece, $g^{10}$, which passes through it and projects both forward and backward, the rear portion being engaged by an eccentric cam, $g^{11}$, on the driving-shaft S. This cam raises the drop-cylinder $g^9$, the upper end of which compresses at the same time a strong elliptic or V-shaped spring, $g^{12}$, that is made of wood, steel, or other suitable material, and is connected to the ceiling or other point of support. The upper end of the spring $g^{12}$ is connected by adjustable side rods, $g^{13}$, and clamp-screws $g^{14}$ to the upper transverse portion of the supporting-frame, as shown in Fig. 1, so as to impart a greater or less tension to the spring $g^{12}$ for obtaining lighter or heavier blows of the drop-die, according as smaller or larger nails are to be made in the machine. Two set-screws, $q$, secure the upright $q'$, to which the side rods, $g^{13}$, are attached, to the frame. A split screw-collar, $g^{15}$, is applied to the threaded upper part of the drop-cylinder $g^9$ by clamp-screws. The collar $g^{15}$ regulates the drop of the die G' and strikes an elastic cushion or plate, $g^{16}$, arranged on a seat at the top part of the supporting-frame, whereby the injuring of the lower die by the drop-die is prevented in case the latter is dropped without a nail-blank having been delivered to the former. The drop-cylinder $g^9$ is prevented from turning on its axis by a spline, $g^{17}$, which is secured to the upper part of the same below the split collar, said spline being guided in a corresponding groove in the upper part of the frame A, as shown in Fig. 5. The drop-cylinder $g^9$ moves in two guide-sleeves, $g^{18}$, which sleeves are connected by vertical side pieces, $g^{19}$, held in ways $g^{25}$, and secured by suitable adjusting-screws, $a^7$, to said ways or uprights $g^{25}$, at the front part of the frame. The guide-sleeves $g^{18}$ may be laterally adjusted by the set-screws $a^6$, and also forward or backward by adjusting-screws $a^7$, so that the exact position of the drop-die relatively to the lower die may be obtained. To lugs on the lower guide-sleeves, $g^{18}$, of the drop-die G' is pivoted a socket, $g^{20}$, that carries an adjustable rod, $g^{21}$, by which the drop-cylinder is supported when the rod $g^{21}$ is swung up in vertical position below the forward projecting front end of the piece $g^{10}$, the rear end of which is engaged by the eccentric cam when lifting the drop-die. The drop-die is retained thereby in raised position whenever any part of the machine has to be adjusted or placed in proper order.

*The throwing-out mechanism.*—The throwing-out mechanism H consists of a lever, $h$, which is arranged in an inclined position between the lower die-sections, $g$ $g^x$, as shown in Figs. 1, 3, and 5. The lever $h$ is adjustably secured by a set screw to the end of a lateral shaft, $h'$, that turns in bearings $h^2$ at the front part of the supporting-frame A. To the outer end of the shaft $h'$ is applied a rearwardly-extending crank-arm, $h^3$, that is connected by a rod, $h^4$, with a fulcrumed lever, $h^5$, the curved rear end of which is acted upon by a cam or wiper, $h^6$, on the driving-shaft S, as shown in Figs. 1 and 2. The throwing-out lever $h$ is thrown forward by its actuating mechanism at the moment when the lower jaws, $g$ $g^x$, are separated from each other after the head of the nail has been formed. The nail is thereby thrown out with considerable force, and the lower jaws are thereby cleared for the reception of the next nail-blank.

*Operation of the machine.*—The reel at the lower part of the machine is first wound with wire of proper thickness for the nails to be made. The end of the wire is then passed through the straightening-rollers and feeding mechanism, and between the knives, until the end of the wire projects somewhat above the latter. The machine is now set in motion. The movable cutting-knife and its sliding carriage are thereby moved by its actuating mechanism against the fixed cutting-knife, whereby a piece of the wire is cut off having the shape shown in Fig. 12, so as to form a heavier head portion and a pointed shank portion. The movable cutting-knife presses at the same time the nail-blank against the fixed cheek in front of the fixed cutting-knife, so as to form the shank of the nail by forcing the reduced end for forming the point of the blank against the end of the cheek $e^7$ and the side of the knife $e^5$, as shown. The carrier, having by this time been moved back by its actuating mechanism, grips the projecting head of the blank in its jaws, being then moved forward toward the jaws $g$ $g^x$ until the carrying-jaws arrive at a point vertically above the same, when they are opened and deliver the shank of the nail between the jaws $g$ $g^x$. The carrier moves back toward the cutting-knives after the lower jaws close upon the shank of the nail, and hold the same rigidly for the action of the drop-die. This has been raised by its actuating mechanism during the cutting off of the blank, but is now dropped as soon as its cam releases the lifting-piece of its cylinder, so as to impart thereby the required shape to the head of the blank, and thus finish the nail. The throwing-out lever is now quickly moved forward and the nail thrown out of the machine. Simultaneously with the return of the carrier the movable cutting-knife is carried endwise or back, and the wire-feeding mechanism is operated, so as to expose the next adjoining part of wire to the action of the cutting-knives. The nail-blank, when severed, is taken up by the carrier and transmitted forward to the die-jaws, where the head is formed by the drop-die, and then it is thrown out, and so on. Each complete revolution of the driving-shaft will form, by the co-operation of the different actuating mechanisms, one complete nail, the head of which may be of any desired shape, either plain or fancy, according to the shape of the drop-die. This machine may be applicable with equal advantage for making the heaviest shoe-nails as well as the lightest ornamental upholsterers' nails.

Having thus described my invention, I claim as new and desire to secure by Letters Patent—

1. The feed mechanism herein described, consisting of the supporting-plate $d$, sliding carriage $d'$, bracket-plate $d^2$, straightening-rollers $d^4$, retaining-cheek $d^6$, inclined dog $d^7$, friction-roller $d^9$, lever $d^{10}$, and serrated jaw $d^8$, all arranged substantially as described.

2. In the feeding mechanism herein described, the combination of a friction-roller, $d^9$, with the serrated jaw $d^8$, the lever $d^{10}$, and screw $d^x$, substantially as set forth.

3. The combination of the feeding mechanism D, constructed substantially as shown, with lever $d^{15}$, rod $d^{17}$, and ring or eccentric $d^{20}$, provided with nose $d^{19}$ and secured to shaft S, all arranged substantially as described.

4. In a nail-machine, the nail-blank-carrying mechanism F, consisting of the levers $f$, having jaws $f'$, provided with retaining wedge-pieces $f^2$, said levers $f$ having oblique slots at their rear ends, forked support $f^3$, connecting-pins $f^4$, short lever $f^5$, and actuating-lever F', operated substantially as specified.

5. The nail-blank-carrying mechanism F herein described, having removable jaws $f$, one of which has a plain face and the other a grooved face, substantially as set forth.

6. In the nail-blank-carrying mechanism F herein described, the combination of the forked holder $f^3$ and its guide-rod $f^6$, the stuffing-box $f^7$, and the support $f^8$, substantially as and for the purpose set forth.

7. In the nail-blank-carrying mechanism F herein described, the combination of the guide-rod $f^6$, passing through the stuffing-box $f^7$ in the support $f^8$, with a connecting-piece, $f^9$, auxiliary guide-rod $f^{10}$, and lug $f^{22}$, to prevent the guide-rod $f^6$ from turning, substantially as set forth.

8. In a nail-machine, the wire-supporting mechanism consisting of the box $e^4$, having the lower jaw, $e$, provided with a groove and adjusted by screw $e'$, and the upper jaw, $e^2$, provided with a groove and adjusted by the screw $e^3$, all substantially as shown and described.

9. In a nail-machine, the combination of the adjustable grooved jaws $e$ and $e^2$ with the movable cutting-knife $e^6$, stationary knife $e^5$, and cheek $e^7$, arranged substantially as specified.

10. The combination of the movable cutting-knife $e^6$ in the sliding carriage $e^{10}$ with the stationary knife $e^5$, adjustable cheek $e^7$, wedge-shaped locking-piece $e^8$, and pressure-screws $e^9$, all arranged substantially as set forth.

11. The combination of the stationary cutting-knife $e^5$, adjusted by screw $e^{16}$, cheek $e^7$, locking-piece $e^8$, and screws $e^9$, with the supporting-box $e^{18}$, adjustable by screws $e^{20}$ in the lugs on the table, substantially as specified.

12. The combination of the movable cutting-knife $e^6$, adjustable by screw $e^{15}$, locking-piece $e^{13}$, screws $e^{14}$, arranged on sliding carriage $e^{10}$, operated by the lever $e^{21}$, and cam $e^{22}$ on shaft S, substantially as set forth.

13. The combination of the nail-forming die G, composed of the fixed and movable jaws $g$ $g^x$, with the head-forming or drop die G', and with mechanism for operating the latter from the driving-shaft in the manner shown and described.

14. The nail-forming die G, consisting of two jaws, $g$ $g^x$, attached to the base-block, adjusted by set-screw $g^2$; in combination with the drop-die G', arranged substantially as specified.

15. The nail-forming die G, consisting of the stationary jaw $g$ and the movable jaw $g^x$, operated by the lever $g^6$, spring $g^4$, and cam $g^7$ on shaft S, all substantially as specified.

16. The combination, with the jaws $g$ $g^x$, of the throwing-out mechanism H, consisting of the adjustable lever $h$ on shaft $h'$, provided with crank-arm $h^3$, rod $h^4$, and lever $h^5$, and operated by the cam $h^6$ on the shaft S in the manner shown and described.

17. The combination, with the drop-die G' and drop-cylinder $g^9$, having projecting piece $g^{10}$, of the socket $g^{20}$, supported in lugs of the guide-sleeve $g^{18}$, and carrying adjustable rod $g^{21}$, for supporting said drop-cylinder, as and for the purpose specified.

18. The combination of the drop-die G' and cylinder $g^9$, having projecting piece $g^{10}$, with cam $g^{11}$, on shaft S, and with springs $g^{12}$, adjustable side rods, $g^{13}$, screws $g^{14}$, and uprights $q'$, secured to the upper portion, $A^2$, of the supporting-frame, substantially as described.

19. The combination of the feed mechanism D, cutting mechanism $e^5$, $e^6$, $e^7$, and $e^8$, nail-blank-carrying mechanism F, and nail holding and forming dies G and G', all constructed as and for the purpose specified.

20. In a nail-machine, the combination of the adjustable cutting-knife $e^5$, cheek $e^7$, and movable cutting-knife $e^6$ with the wire-supporting mechanism having upper and lower guide-jaws, $e$ and $e^2$, arranged at right angles to the knives, all constructed as and for the purpose set forth.

21. In a nail-machine, the nail-blank-carrying mechanism, constructed as shown, in combination with the holding-die G, drop-die G', and the feed mechanism D, constructed and operated substantially as and for the purpose set forth.

In testimony that I claim the foregoing as my invention I have signed my name, in presence of two witnesses, this 4th day of October, 1881.

RUDOLF EGLI.

Witnesses:
HERMANN WEGMANN,
ALEX. BANNWART.